(12) United States Patent
Ito et al.

(10) Patent No.: US 9,420,201 B2
(45) Date of Patent: Aug. 16, 2016

(54) IMAGE PROCESSING APPARATUS, IMAGE PROCESSING METHOD, AND PROGRAM

(71) Applicants: SONY CORPORATION, Tokyo (JP); WILLIAM MARSH RICE UNIVERSITY, Houston, TX (US)

(72) Inventors: Atsushi Ito, Tokyo (JP); Ashok Veeraraghavan, Houston, TX (US); Kaushik Mitra, Houston, TX (US); Salil Tambe, Houston, TX (US)

(73) Assignees: SONY CORPORATION, Tokyo (JP); WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 14/594,720

(22) Filed: Jan. 12, 2015

(65) Prior Publication Data

US 2015/0206314 A1     Jul. 23, 2015

Related U.S. Application Data

(60) Provisional application No. 61/929,589, filed on Jan. 21, 2014.

(51) Int. Cl.
  *G06K 9/00*     (2006.01)
  *H04N 5/235*    (2006.01)
  *H04N 5/232*    (2006.01)

(52) U.S. Cl.
  CPC ......... *H04N 5/2356* (2013.01); *H04N 5/23232* (2013.01)

(58) Field of Classification Search
  CPC ................ G06T 7/0075; G06T 2007/10012; G06K 9/6269
  USPC ................................................ 382/154, 255
  See application file for complete search history.

(56) References Cited

PUBLICATIONS

Hasinoff et al: "Confocal Stereo", Int J. Computer Vision, 2009.*

* cited by examiner

*Primary Examiner* — Ruiping Li
(74) *Attorney, Agent, or Firm* — Oblon, McClelland, Maier & Neustadt, L.L.P.

(57) ABSTRACT

Provided is an image processing apparatus including an image generation unit that, from photographic images that are captured using multiple photographic parameters, generates an image of which values of the multiple photographic parameters are different from values of the photographic image.

20 Claims, 16 Drawing Sheets

97   96

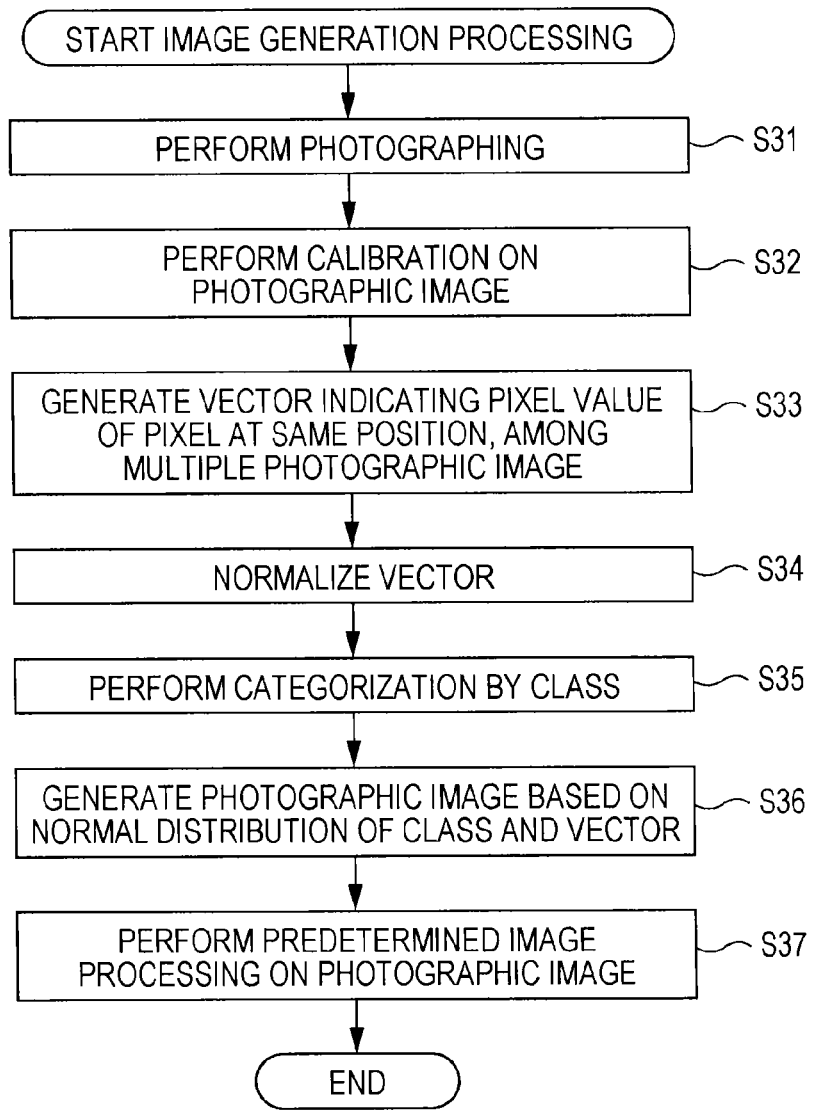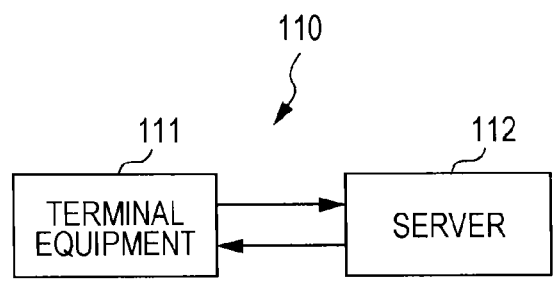

IMAGE PROCESSING APPARATUS, IMAGE PROCESSING METHOD, AND PROGRAM

CROSS REFERENCE TO RELATED APPLICATIONS

This application claims the benefit of U.S. Provisional Application No. 61/929,589 filed Jan. 21, 2014, the entire contents of which are incorporated herein by reference.

BACKGROUND

The present disclosure relates to an image processing apparatus, an image processing method, and a program, and more particularly to an image processing apparatus, an image processing method, and a program for generating from photographic images an image of which values of multiple photographic parameters are different from values of the photographic image.

A photographic image that is captured with an imaging apparatus while changing a value of a photographic parameter is called epsilon photography (for example, refer to Ramesh Raskar. Computational photography: Epsilon to coded photography. In Emerging Trends in Visual Computing, 2008, pp. 238-253), and has been used as a keyword for the connection between imaging and computer graphics. As the photographic parameter, for example, there are a focus position, an f-stop, a shutter speed, ISO sensitivity, and the like.

In recent years, many technologies have been proposed that perform image processing using a photographic image that is captured while changing a value of one photographic parameter. As such a technology, for example, there is a technology that produces an image in a high dynamic range using an image stack that is made from multiple photographic images which are captured while changing the shutter speed (for example, refer to Paul E. Debevec and Jitendra Malik, Recovering High Dynamic Range Radiance Maps from Photographs. In SIGGRAPH 97, August 1997).

Furthermore, there is a technology that generates a light field using the image stack that is made from multiple photographic images which are captured while changing the focus position (for example, refer to Anat Levin and Frédo Durand, Linear view synthesis using a dimensionality gap light field prior, Conference on Computer Vision and Pattern Recognition (CVPR), 2010). The light field is used in viewpoint conversion as disclosed in Anat Levin and Frédo Durand, Linear view synthesis using a dimensionality gap light field prior, Conference on Computer Vision and Pattern Recognition (CVPR), 2010, or is used when refocus or depth-of-field control is performed (for example, refer to Ng, R., Levoy, M., Br_edif, M., Duval, G., Horowitz, M., and Hanrahan, P. Light field photography with a hand-held plenoptic camera. Tech. report, Stanford University, April 2005).

Moreover, there is a technology called a depth-from-focus (DFF) that estimates a depth value indicating a position in a depth direction, of a photographic subject, using the image stack that is made from multiple photographic images which are captured while changing the focus position (for example, S. K. Nayar and Y. Nakagawa, "Shape from Focus," IEEE Transactions on Pattern Analysis and Machine Intelligence, Vol. 16, No. 8, pp. 824-831, August 1994 a).

Furthermore, in recent years, technologies have been proposed that perform image processing using a photographic image that is captured while changing values of two photographic parameters. As such a technology, for example, there is a technology that generates a depth map that is high in spatial resolution or reliability compared to DFF and the like, using an image stack that is made from multiple photographic images that are captured while changing a focus position value and an f-stop value (for example, refer to Samuel W. Hasinoff and Kiriakos N. Kutulakos, Confocal Stereo, International Journal of Computer Vision, 81(1), pp. 82-104, 2009).

SUMMARY

However, as a method of obtaining the image stack, there is only a method of performing photographing while changing a photographic parameter, and much effort is necessary for doing so. Particularly, if multiple photographic parameters to be changed are present, the number of necessary photographic images increases, and this is not practical. Therefore, it is desirable that an image of which values of multiple photographic parameters are different from values of the photographic image be generated from the photographic images.

It is desirable to generate from photographic images an image of which values of multiple parameters are different from values of the photographic image.

According to one embodiment of the present disclosure, there is provided an image processing apparatus including an image generation unit that, from photographic images that are captured using multiple photographic parameters, generates an image in which values of the multiple photographic parameters are different from a value of the photographic image.

An image processing method and a program according to another embodiment of the present disclosure correspond to the image processing apparatus according to the one embodiment of the disclosure.

According to the embodiments of the present disclosure, from photographic images that are captured using multiple photographic parameters, an image is generated in which values of the multiple photographic parameters are different from a value of the photographic image.

According to the embodiments of the present disclosure, an image can be generated. Furthermore, according to the embodiments of the present disclosure, from photographic images, an image can be generated in which values of multiple photographic parameters are different from a value of the photographic image.

Moreover, a limitation to this effect is not imposed, and any effects that are described in the present disclosure may be possible.

BRIEF DESCRIPTION OF THE DRAWINGS

FIG. 16 is a flow chart for describing image generation processing by the imaging apparatus in FIG. 8.

FIG. 17 is a block diagram illustrating a configuration example of an image processing system to which the present disclosure applies.

DETAILED DESCRIPTION OF EMBODIMENTS

Outline of the Present Disclosure

Figure 1:
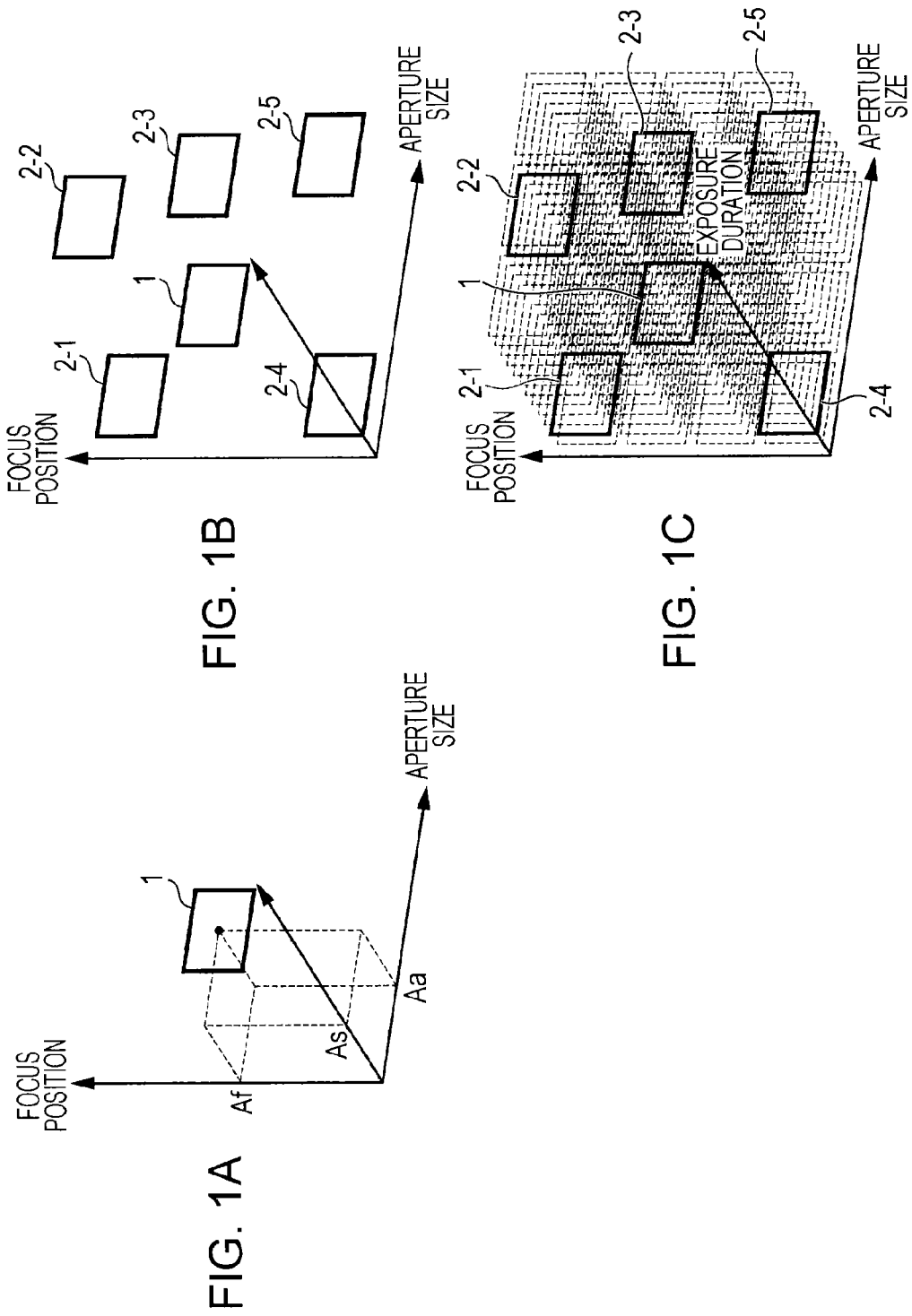
FIGS. 1A to 1C are diagrams for describing an outline of the present disclosure.

FIGS. 1A to 1C are diagrams for describing an outline of the present disclosure.

Moreover, in FIGS. 1A to 1C, photographic parameters are assumed to be a focus position, an f-stop (aperture size), and a shutter speed (exposure duration).

As illustrated in FIG. 1A, in a general imaging apparatus, an optimal value of a photographic parameter is determined, and one photographic image 1 is captured using the optimal value of the photographic parameter.

On the other hand, in the present disclosure, as illustrated in FIG. 1B, in addition to the photographic image 1, multiple photographic images 2-1 to 2-5 (five examples in FIG. 1B), each of which is different in a value of at least one photographic parameter from the photographic image 1, are captured. Moreover, the number of photographic images that are captured in addition to the photographic image 1 is not limited to 5.

In the present disclosure, as illustrated by dotted-line rectangles in FIG. 1C, predicted values of photographic images that are different in the photographic parameter value from the photographic image 1 and the photographic images 2-1 to 2-5 are generated using the photographic image 1 and the photographic image 2-1 to 2-5. That is, the predicted values of photographic images that are densely sampled are generated from the photographic images that are sparsely sampled.

A case where the photographic parameters are a focus position and f-stop is described below, but the same is true for a case where photographic parameters different in type from these photographic parameters are used or a case where the number of photographic parameters is 3 or greater.

First Embodiment

Configuration Example of a Learning Apparatus According to One Embodiment

Figure 2:
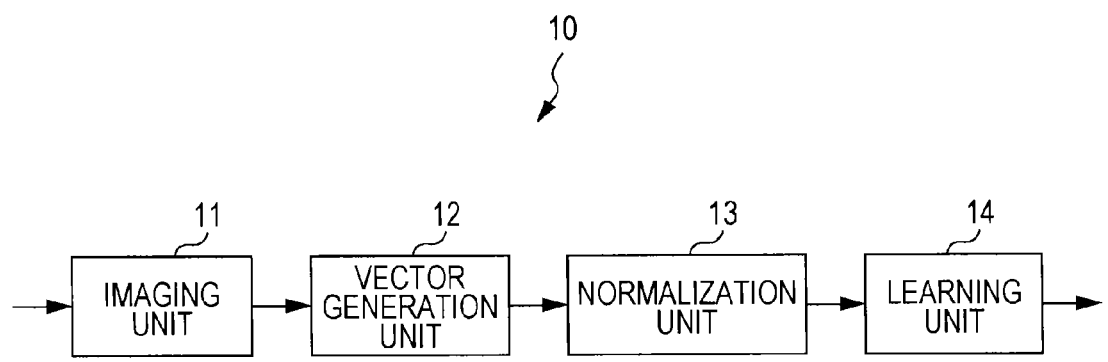
FIG. 2 is a block diagram illustrating a configuration example of a learning apparatus according to one embodiment, to which the present disclosure applies.

FIG. 2 is a block diagram illustrating a configuration example of a learning apparatus according to one embodiment, to which the present disclosure applies.

The learning apparatus 10 in FIG. 2 is configured from an imaging unit 11, a vector generation unit 12, a normalization unit 13, and a learning unit 14. The learning apparatus 10 learns learning parameters that are used when the predicted value of a photographic image that is different, in a combination of a focus position value and an f-stop value, from a combination of the photographic images is generated from the photographic images.

Specifically, the imaging unit 11 of the learning apparatus 10 sets the combination of the focus position value and the f-stop value to different combinations A the number of which is a and performs photographing. The combination A is the combination of the focus position value and the f-stop value, which corresponds to the photographic image (the predicted value thereof) that is generated in the imaging apparatus described below. The imaging unit 11 supplies the multiple photographic images that are obtained as a result of the photographing, as learning photographic images (full stack data), to the vector generation unit 12.

The vector generation unit 12 performs calibration on the multiple learning photographic images that are supplied from the imaging unit 11. The vector generation unit 12 generates vectors indicating pixel values of pixels at the same position, among the multiple post-calibration learning photographic images. The vector generation unit 12 supplies the vector of each pixel to the normalization unit 13.

The normalization unit 13 normalizes the vector of each pixel that is supplied from the vector generation unit 12 in such a manner that an absolute value of the vector is 1, and supplies a result of the normalization to the learning unit 14.

The learning unit 14 performs clustering, which uses principal component analysis (PCA), on the vectors of all the pixels that are supplied from the normalization unit 13 and determines a class. Specifically, the learning unit 14 performs singular value decomposition (SVD) analysis on a variance/covariance matrix of the vectors of all the pixels, and sets high-order main components, the number of which is k, to be a class.

The learning unit 14 learns a normal distribution N indicating an average and the covariance matrix for each class, as the learning parameters for a Gaussian Mixture Model (GMM). The normal distribution N is expressed by the following Equation (1).

$$P(x) = \sum_{i=1}^{K} \alpha_i N(m_i, \Sigma_i) \quad (1)$$

In Equation (1), P(x) is a statistical coefficient called GMM Prior. i indicates a class number, and $\alpha_i$ indicates a weighting coefficient of a class the class number of which is i. $\alpha_i$ is set in such a manner that a sum of all the classes is 1. $\alpha_i$ is basically the same value (1/K) in each class. $m_i$ indicates an average for the class the class number of which is i, and $\Sigma_i$ indicates the covariance matrix for the class the class number of which is i. P(x) indicating the normal distribution N is supplied to and stored in the imaging apparatus described below.

Description of the Calibration

Figure 3:
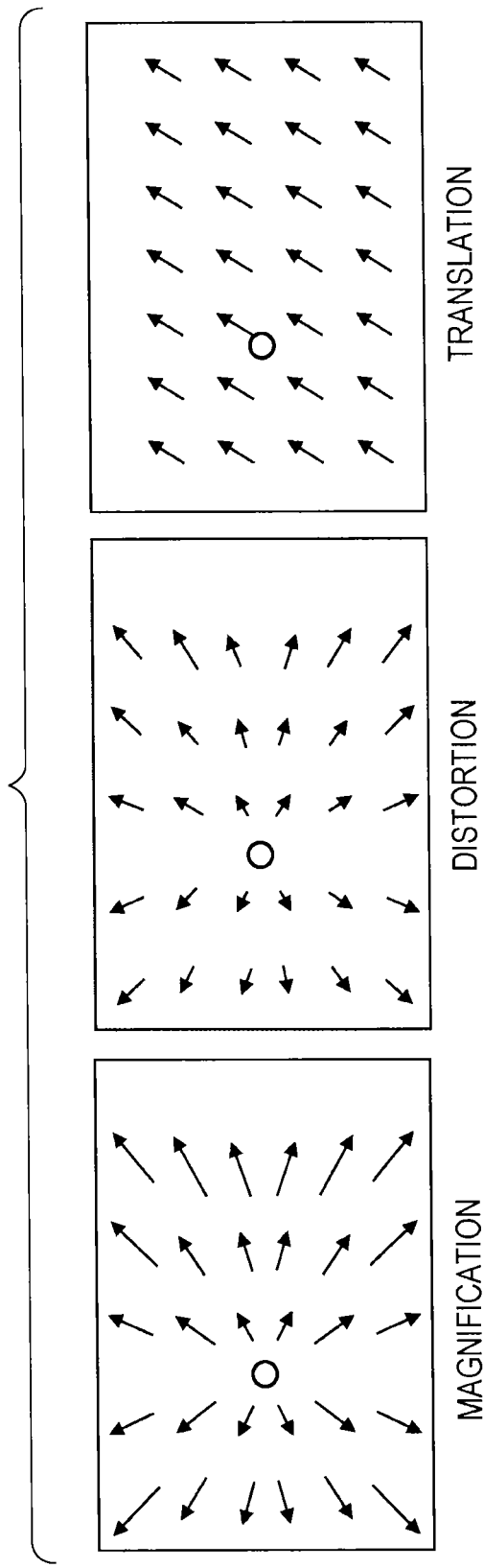
FIG. 3 is a diagram for describing calibration.
Figure 4:
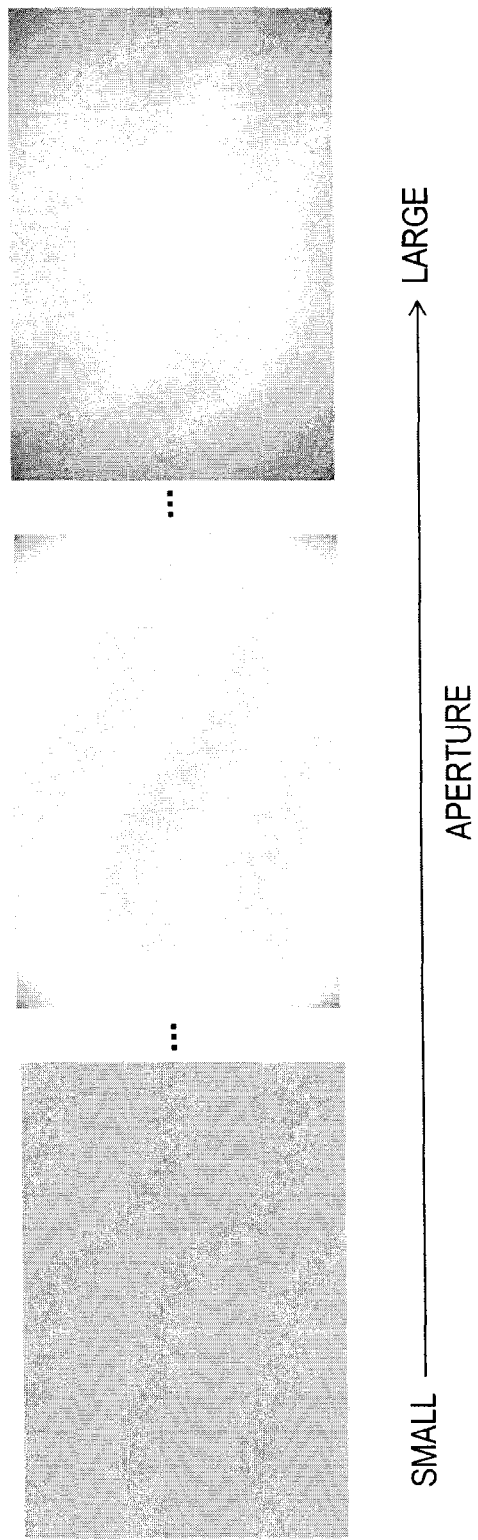
FIG. 4 is a diagram for describing the calibration.

FIGS. 3 and 4 are diagrams for describing the calibration by the vector generation unit 12 in FIGS. 1A to 1C.

In order to learn the learning photographic image, among all the learning photographic images, one point on each photographic image has to be in precisely the same position. However, when the focus position and the f-stop are changed, deviation in the position on the photographic image occurs.

Therefore, the vector generation unit 12 performs the calibration on the learning photographic image.

As the calibration that is performed by the vector generation unit 12, for example, the calibration disclosed in Samuel W. Hasinoff and Kiriakos N. Kutulakos, Confocal Stereo, International Journal of Computer Vision, 81(1), pp. 82-104, 2009 can be employed. For this calibration, two types of calibration, that is, geometric alignment and brightness constancy, are performed.

First, the geometric alignment is described referring to FIG. 3.

Generally, when the focus position is moved, as illustrated in FIG. 3, the photographic image is enlarged or reduced (magnification and reduction), lens distortion occurs, global parallel movement (translation) occurs or so forth. As a result, the deviation in the position on the photographic image occurs.

Therefore, the vector generation unit 12 retains a position correction table in which the focus position value and the amount of deviation in the position on the photographic image are associated with each other, and performs the calibration to compensate for the deviation in the position on the photographic image, based on the position correction table.

Moreover, for example, the position correction table is generated as follows. First, a used-for-calibration chart is prepared and multiple learning photographic images are obtained that are different only in the focus position value from one another. At this time, it is desirable that the f-stop be set to as small a value as possible (to a value at which a depth of field is large). Next, a correspondence point search is conducted on each of the multiple obtained learning photographic images, and the amount of deviation in the position on the photographic image is measured. Then, the position correction table is generated in which the measured amount of deviation in the position on the photographic image and the focus position are associated with each other.

Next, the brightness constancy is described referring to FIG. 4.

As illustrated in FIG. 4, when the f-stop is changed, brightness of the photographic image is changed as well as the depth of field. That is, the larger the f-stop, the brighter the photographic image. Furthermore, the brightness of the photographic image differs also with the spatial position. The photographic image is the brightest on a lens axis and is dark at the edge of a screen. The extent to which the brightness changes according to a distance from the lens axis differs with a focus position.

Therefore, the vector generation unit 12 retains a brightness correction table in which the combination of the focus position value and the f-stop value and an amount of deviation in the brightness of the photographic image are associated with each other, and calibrates the brightness of the photographic image based on the brightness correction table.

Moreover, for example, the brightness correction table is generated as follows. First, a simple white object or the like is prepared as a used-for-calibration photographic subject, and multiple learning photographic images are obtained that are different, in the combination of the focus position value and the f-stop value, from one another. Next, the brightness of each pixel of the learning photographic image that is captured with the combination of the focus position value and the f-stop value that serves as a reference and the brightness of each pixel of the learning photographic image that is captured with any other combination are compared with each other, and a brightness ratio between the two pixels is set to be an amount of deviation in the brightness. Then, the position correction table is generated in which the measured amount of deviation in the brightness of each pixel and the combination of the focus position value and the f-stop value are associated with each other.

Generation of the position correction table and the brightness correction table is basically preformed one time on a lens of the imaging unit 11.

Description of Learning

Figure 5:
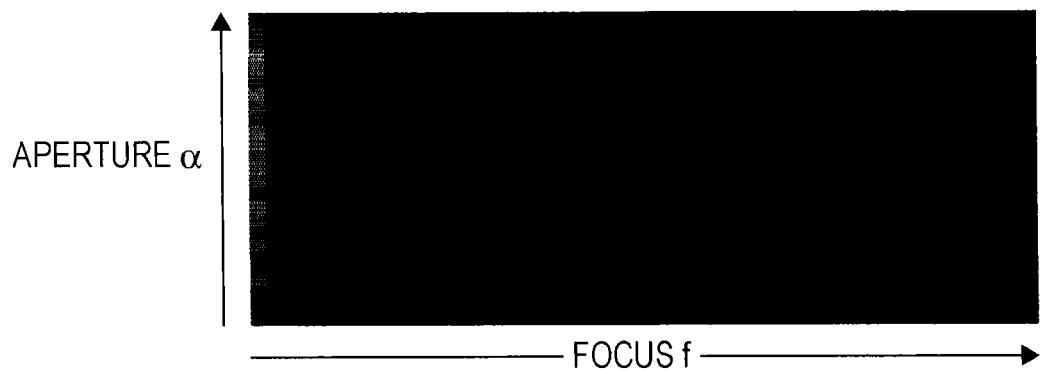
FIG. 5 is a diagram illustrating pixel values of pixels at the same position, among multiple photographic images that are different, in a combination of a focus position value and an f-stop value, from one another.

FIG. 5 is a diagram illustrating the pixel values of the pixels at the same position, among the multiple photographic images that are different, in the combination of the focus position value and the f-stop value, from one another.

Moreover, in FIG. 5, a horizontal axis indicates the focus position value of the photographic image, and a vertical axis indicates the f-stop value. Furthermore, in FIG. 5, the pixel value of the photographic image that corresponds to the focus position value and the f-stop value is illustrated by intensity at a position that corresponds to the focus position value and the f-stop value. The lower the intensity, the closer the focus position value comes to the optimal value.

As illustrated in FIG. 5, the pixels at the same position, among the multiple photographic images, make up a very sparse two-dimensional signal. Specifically, if the f-stop value is small, the pixel value of the pixels at the same position, among the photographic images is the same value in many of the focus positions, and if the f-stop value is large, there is a large difference between a case where the focus position is at the optimal value and the other cases. In the present disclosure, special attention is given to such pixel sparsity, and the normal distribution of the vectors that indicate the pixel values of the pixels at the same position is learned.

Description of the Vector of Each Pixel of the Learning Photographic Image

Figure 6:
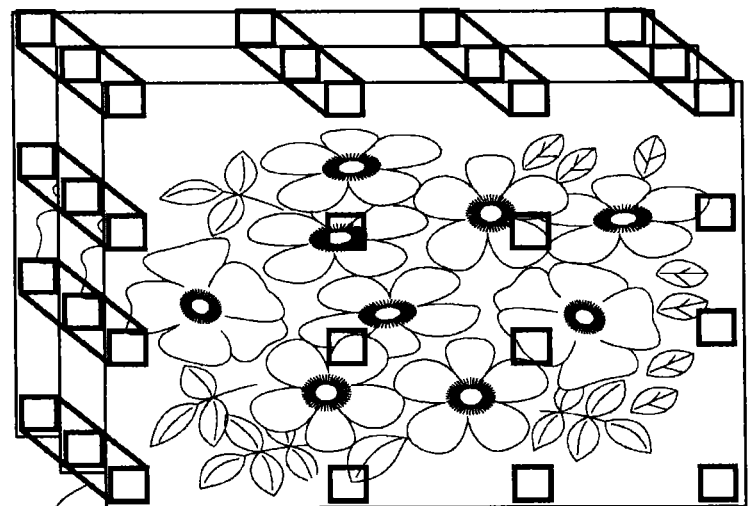
FIG. 6 is a diagram for describing a vector of each pixel of a learning photographic image.

FIG. 6 is a diagram for describing the vector of each pixel of the learning photographic image.

As illustrated in FIG. 6, the vector generation unit 12 generates the vector indicating a pixel value of a group 31 of pixels at the same position, among the multiple learning photographic images (three pixels in an example in FIG. 6). The vector is normalized.

Description of Processing by the Learning Apparatus

Figure 7:
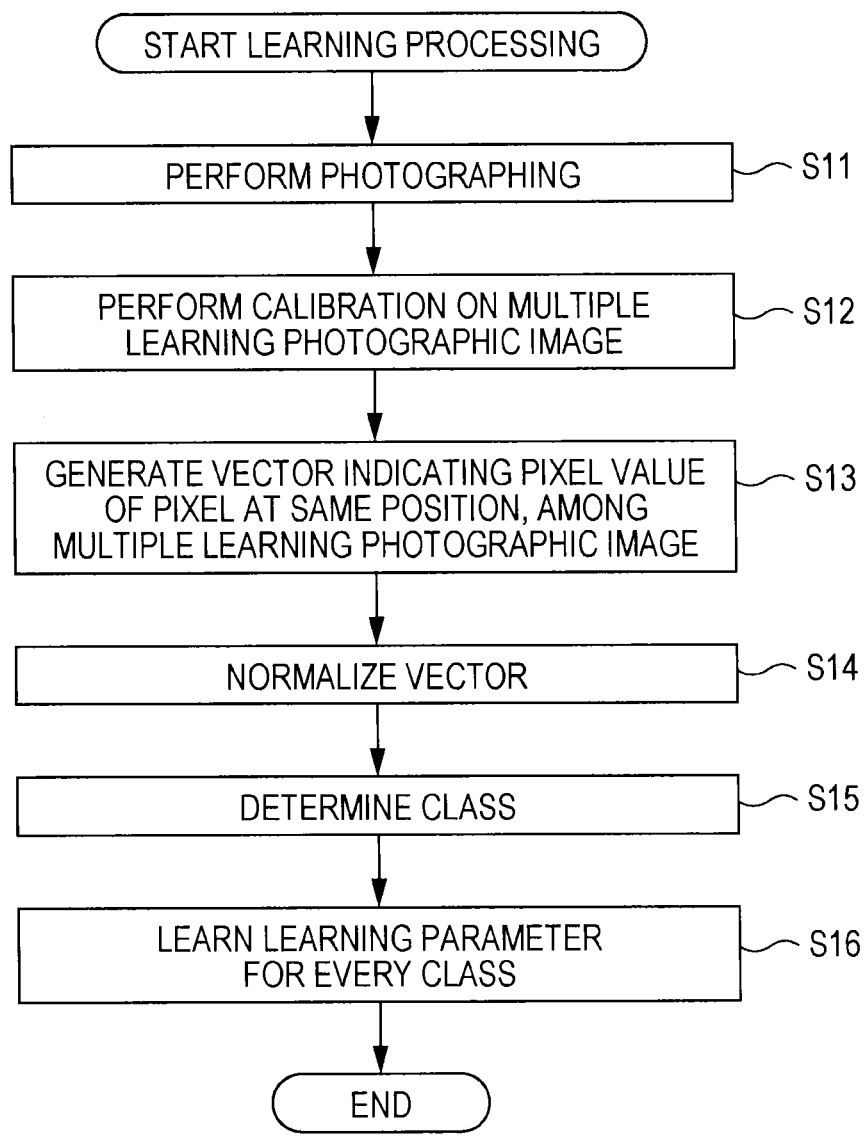
FIG. 7 is a flow chart for describing learning processing by the learning apparatus in FIG. 2.

FIG. 7 is a flow chart for describing learning processing by the learning apparatus 10 in FIG. 2.

In Step S11 in FIG. 7, the imaging unit 11 of the learning apparatus 10 sets the value combination of the focus position value and the f-stop value to the combination A the number of which is a, and thus performs the photographing. The imaging unit 11 supplies the multiple photographic images that are obtained as a result of the photographing, as the learning photographic images, to the vector generation unit 12.

In Step S12, the vector generation unit 12 performs the calibration on the multiple learning photographic images that are supplied from the imaging unit 11. In Step S13, the vector generation unit 12 generates the vectors indicating the pixel values of the pixels at the same position, among the multiple post-calibration learning photographic images. The vector generation unit 12 supplies the vector of each pixel to the normalization unit 13.

In Step S14, the normalization unit 13 normalizes the vector of each pixel that is supplied from the vector generation unit 12, in such a manner that the absolute value of the vector is 1, and supplies a result of the normalization to the learning unit 14.

In Step S15, the learning unit 14 performs the clustering, which uses principal component analysis, on the vectors of all the pixels that are supplied from the normalization unit 13 and determines the class.

In Step S16, the learning unit 14 learns the normal distribution N indicating the average and the covariance matrix for each class, as the learning parameters for the Gaussian Mixture Model (GMM). P(x) indicating the normal distribution N is supplied to and stored in the imaging apparatus described below.

Configuration Example of the Imaging Apparatus according to One Embodiment

Figure 8:
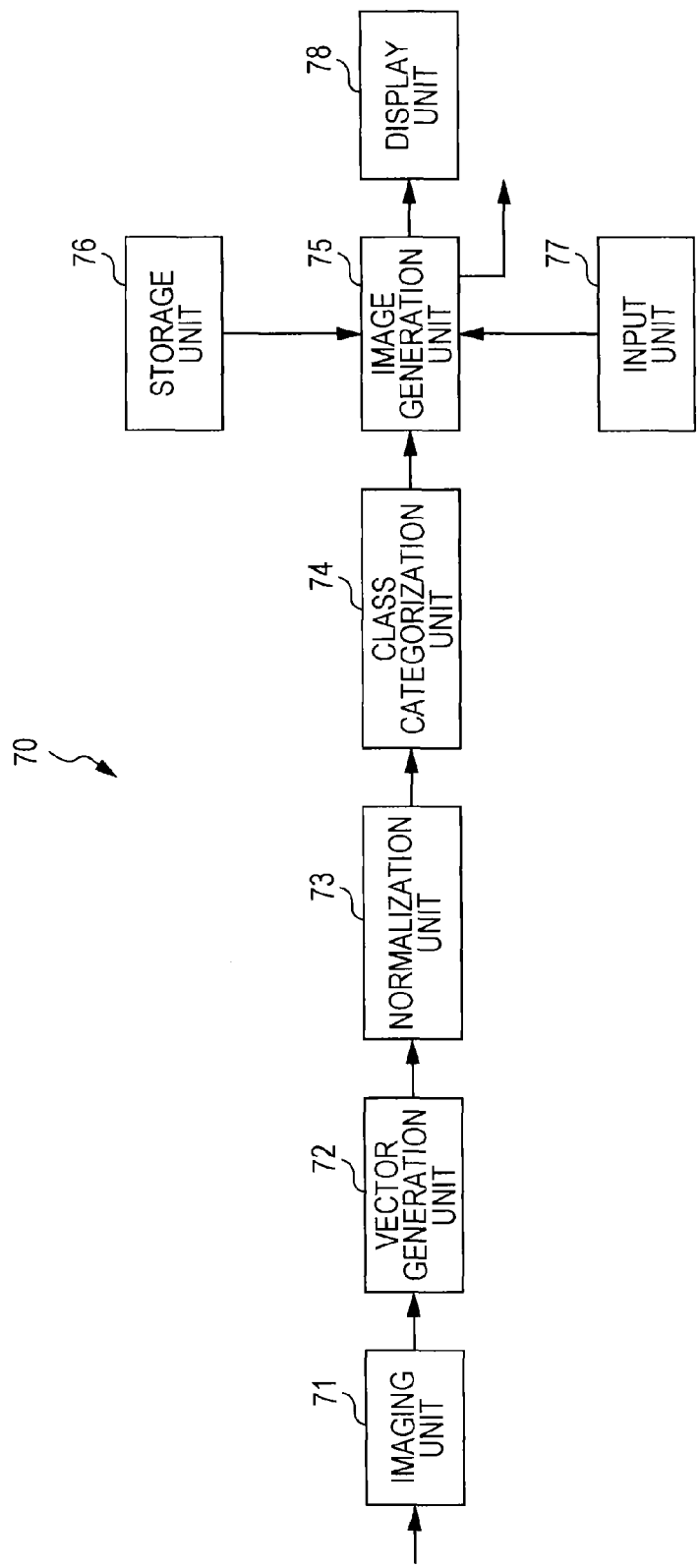
FIG. 8 is a block diagram illustrating a configuration example of an imaging apparatus according to one embodiment, as an image processing apparatus to which the disclosure applies.

FIG. 8 is a block diagram illustrating a configuration example of an imaging apparatus according to one embodiment of the present disclosure, as an image processing apparatus to which the disclosure applies.

An imaging apparatus 70 in FIG. 8 is configured from an imaging unit 71, a vector generation unit 72, a normalization unit 73, a class categorization unit 74, an image generation unit 75, a storage unit 76, an input unit 77, and a display unit 78. The imaging apparatus 70 generates from the photographic images the predicted value of the photographic image that is different in the combination of the focus position value and the f-stop value from the combination of the photographic images.

Specifically, the imaging unit 71 of the imaging apparatus 70 sets the combination of the focus position value and the f-stop value to different combinations B the number of which is b (b<a), and thus performs the photographing. Moreover, the combination B is one portion of the combination A. The imaging unit 71 supplies to the vector generation unit 72 the multiple photographic images that are obtained by the result of the photographing.

Like the vector generation unit 12 in FIG. 2, the vector generation unit 72 performs the calibration on the multiple photographic images that are supplied from the imaging unit 71. The vector generation unit 72 generates the vectors indicating the pixel values of pixels at the same position, among the multiple post-calibration photographic images. The vector generation unit 12 supplies the vector of each pixel to the normalization unit 73.

The normalization unit 73 normalizes the vector of each pixel that is supplied from the vector generation unit 72 in such a manner that the absolute value of the vector is 1, and supplies the result of the normalization to the class categorization unit 74.

For every pixel, the class categorization unit 74 categorizes by class the vector that is supplied from the normalization unit 73. The class categorization unit 74 supplies to the image generation unit 75 the class of the vectors of the pixels.

For every pixel, the image generation unit 75 reads from the storage unit 76 the normal distribution N of the class that is supplied from the class categorization unit 74. For every pixel, the image generation unit 75 generates the photographic image (predicted value thereof) that is available if the combination of the focus position and the f-stop value is the combination A, based on the normal distribution N that is read and on the vector that is supplied from the class categorization unit 74. The image generation unit 75 outputs the generated photographic image to the display unit 78, whenever necessary.

Furthermore, the image generation unit 75 performs predetermined image processing on the generated photographic image according to operation of the input unit 77, and outputs a result of the image processing to the display unit 78 and the like.

As the image processing by the image generation unit 75, for example, there is processing in which the photographic image that corresponds to the focus position value or the f-stop value that is supplied from the input unit 77, or to the combination of the focus position value and the f-stop value is selected from among the generated photographic images. In this case, the selected photographic image, which results from performing the image processing, is output to the display unit 78.

Accordingly, refocusing of the photographic image to be displayed or control of the depth of field can be performed without establishing a light field. As a result, it does not have to install special hardware compared with a technology and the like in Ng, R., Levoy, M., Br_edif, M., Duval, G, Horowitz, M., and Hanrahan, P. Light field photography with a hand-held plenoptic camera. Tech. report, Stanford University, April 2005, in which that the light field is generated and the refocusing or the control of the depth of field is realized using the light field. Furthermore, the refocusing or the control of the depth of field can be realized without damaging spatial resolution.

As the image processing by the image generation unit 75, furthermore, there is processing in which a DFF disclosed in S. K. Nayar and Y. Nakagawa, "Shape from Focus," IEEE Transactions on Pattern Analysis and Machine Intelligence, Vol. 16, No. 8, pp. 824-831, August 1994 a and the like is performed using a stack of the photographic images each of which has only a different focus position value, among the generated photographic images. Such processing is processing that uses a phenomenon where if a position in a depth direction of the image is consistent with the focus position, a sharp image is obtained, and if not, a dim image is obtained. Specifically, in the processing, in each focus position, a spatial frequency of the vicinity of each pixel is evaluated, and a depth value of the sharpest pixel is set to be a value indicating the focus position. In this case, as a result of the image processing, a depth map is output that indicates the depth value of each pixel.

Moreover, as the image processing by the image generation unit 75, there is processing in which the depth map is generated with a technique disclosed in Samuel W. Hasinoff and Kiriakos N. Kutulakos, Confocal Stereo, International Journal of Computer Vision, 81(1), pp. 82-104, 2009 and the like using a stack of the photographic images each of which has a different combination of the focus position value and the f-stop value, among the generated photographic images. In this case, as a result of the image processing, the depth map is output that has a higher spatial resolution and reliability than with the DFF.

Furthermore, as the image processing by the image generation unit 75, there is processing in which the depth map is generated using the DFF disclosed in S. K. Nayar and Y. Nakagawa, "Shape from Focus," IEEE Transactions on Pattern Analysis and Machine Intelligence, Vol. 16, No. 8, pp. 824-831, August 1994 a and the like or the technique disclosed in Samuel W. Hasinoff and Kiriakos N. Kutulakos, Confocal Stereo, International Journal of Computer Vision, 81(1), pp. 82-104, 2009 and the like, and a three-dimensional image is generated using the depth map and the photographic image. The generation of the three-dimensional image that uses the depth map is disclosed in detail, for example, in KinectFusion: Real-time dense surface mapping and tracking. Richard A. Newcombe, Shahram Izadi, Otmar Hilliges, David Molyneaux, David Kim, Andrew J. Davison, Pushmeet Kohli, Jamie Shotton, Steve Hodges, and Andrew W. Fitzgibbon. ISMAR, page 127-136. IEEE, (2011). In such processing, as a result of the image processing, the three-dimensional image is output to the display unit 78 and the like.

Moreover, as the image processing by the image generation unit 75, there is viewpoint conversion processing in which the light field is established with the technique disclosed in Anat Levin and Frédo Durand, Linear view synthesis using a dimensionality gap light field prior, Conference on Computer Vision and Pattern Recognition (CVPR), 2010 and the like, using a stack of the photographic images each of which has a different focus position, among the generated photographic images, and a photographic image from a viewpoint that is supplied from the input unit 77 is generated using the light field. In this case, as a result of the image processing, the photographic image from the viewpoint that is supplied from the input unit 77 is output to the display unit 78 and the like.

Furthermore, as the image processing by the image generation unit 75, there is processing in which an image in a high dynamic range is generated in the same manner as with the technique that uses the shutter speed disclosed in Paul E. Debevec and Jitendra Malik, Recovering High Dynamic Range Radiance Maps from Photographs. In SIGGRAPH 97, August 1997, using a stack of the photographic images each of which has only a different f-stop value, among the generated photographic images. In this case, as a result of the image processing, the image in the high dynamic range is output to the display unit 78 and the like.

Moreover, in the processing in which the image in the high dynamic range is generated using a stack of the photographic images each of which has only different f-stops, in a case where there are many types of the f-stop in the stacks of the photographic images, that is, in a case where a sampling rate of the photographic image is high, image quality of the image in the high dynamic range increases. Because the photographic image that is generated by the image generation unit 75 has a higher sampling rate than the photographic image that is captured by the imaging unit 71, the image generation unit 75 can generate the high-quality image in the high dynamic range.

P(x) indicating the normal distribution N that is learned by the learning apparatus 10 in FIG. 2 is stored in the storage unit 76.

An operation is applied by the user to the input unit 77, and according to the operation, information is supplied to the image generation unit 75. For example, a desired focus position or f-stop is input by the user into the input unit 77, and the desired focus position or f-stop is supplied to the image generation unit 75. Furthermore, the input unit 77 receives an instruction to generate the depth map, the three-dimensional image, or the image in the high dynamic range and supplies the instruction to the image generation unit 75. Moreover, a viewpoint is input into the input unit 77, and the viewpoint is supplied to the image generation unit 75.

The display unit 78 displays the result of the image processing that is supplied from the image generation unit 75.

Example of the Combination B

Figure 9:
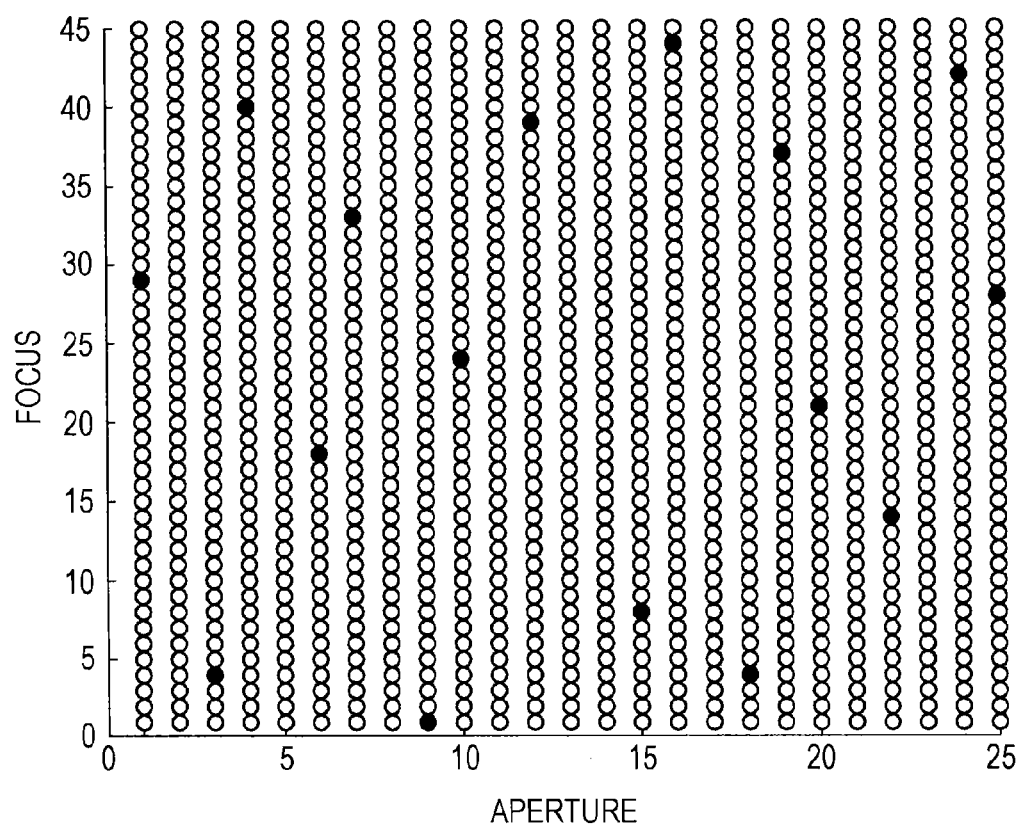
FIG. 9 is a diagram illustrating an example of a combination B.
Figure 10:
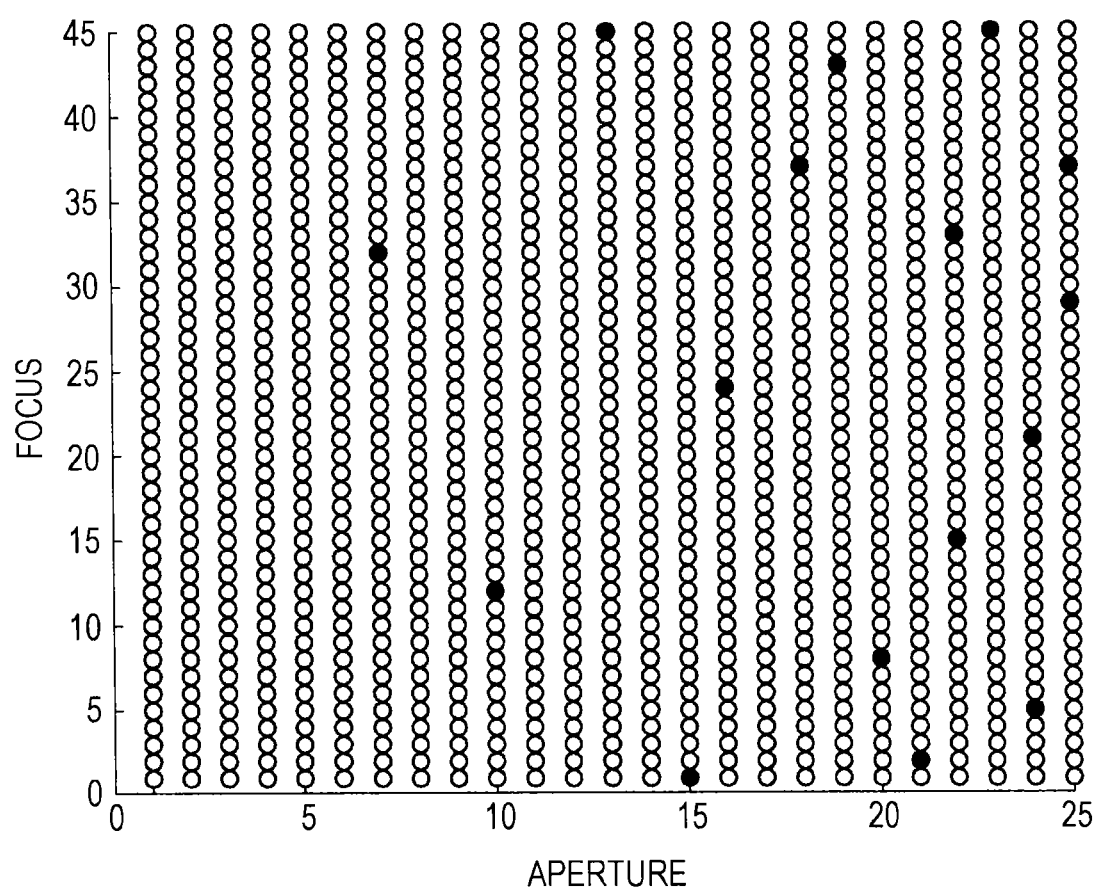
FIG. 10 is a diagram illustrating an example of the combination B.

FIGS. 9 and 10 are diagrams, each illustrating an example of the combination B.

In FIGS. 9 and 10, the horizontal axis indicates numbers that are assigned to the f-stop in order of decreasing value, and the vertical axis indicates numbers that are assigned to the focus positions in order of decreasing value. Furthermore, white circles and black circles indicate the combination A and the black circles indicate the combination B.

In the examples in FIGS. 9 and 10, the number of the f-stop values in the combination A is 25, and the number of the focus position values is 45. That is, the number a of the combinations A is 1,125 (=25×45). In this case, for example, as illustrated in FIG. 9, the combinations B can be set to be 16 combinations that are selected at random from among the combinations A.

Furthermore, as illustrated in FIG. 10, the combination with a large f-stop value may be selected preferentially as the combination B without being selected at random. In this case, for example, the f-stop of the combination B is determined in such a manner that a probability that an f-stop number N (N is an integer and 1≤N≤25) will appear is N times a probability that an f-stop number 1 will appear. That is, for example, the f-stop of the combination B is determined in such a manner that a probability that the f-stop value whose f-stop number is 25 will appear is 25 times a probability that the f-stop value whose f-stop number is 1 will appear.

Specifically, a total of 1, 2, and so forth up to 25 is 325. Therefore, numbers from 1 to 325 occur as uniform random numbers, and the numbers 25, 24 and so forth down to 1 in this order are subtracted from the uniform random number. Then, when a subtraction value is equal to or less than 0, the subtraction ends. A subtrahend at that time is set to be an f-stop number of the combination B.

For example, if the generated uniform random number is 70, first, 25 is subtracted from 70 and thus a subtraction value of 45 (=70-25) is obtained. Next, 24 is subtracted from the subtraction value of 45, and thus a subtraction value of 21 (=45−24) is obtained. Thereafter, 23 is subtracted from the subtraction value of 21, and thus a subtraction value of −2 (=21−23) is obtained. At this time, the subtraction value of −2 is less than 0, the subtraction ends, and the number 23 is set to be the f-stop number of the combination B. The number of the focus position of the combination B is the uniform random number.

Description of the Generation of the Photographic Image (Predicted Value thereof)

Figure 11:
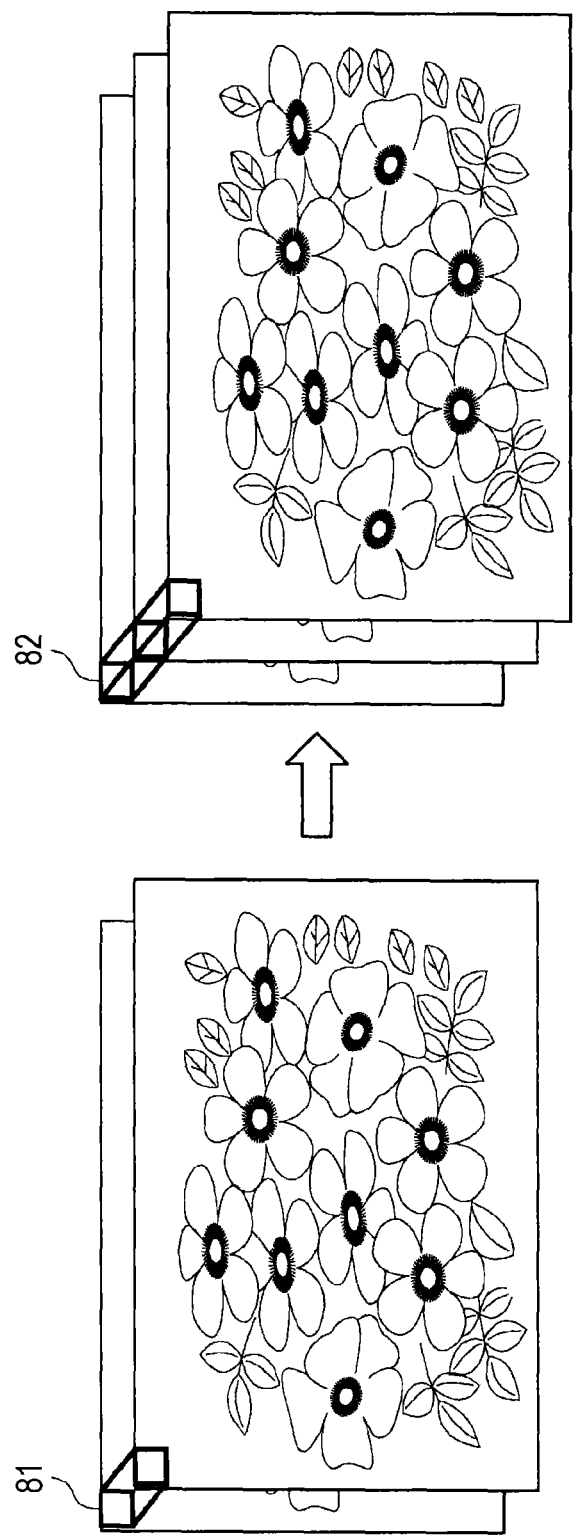
FIG. 11 is a diagram illustrating a relationship between the captured photographic image and the generated photographic image (predicted value thereof).

FIG. 11 is a diagram illustrating a relationship between the photographic image captured by the imaging unit 11 and the photographic image (predicted value thereof) that is generated by the image generation unit 75.

As illustrated in FIG. 11, the image generation unit 75 generates the vector indicating the pixel value of a group 82 of pixels at the same position, among the photographic images (predicted values thereof) having the combination A, from the vector indicating the pixel value of a group 81 of pixels at the same position, among the photographic images having the combination B, which are captured by the imaging unit 11.

At this point, the vector indicating the pixel value of the group 81 of pixels is set to be a matrix y, and the vector indicating the pixel value of the group 82 of pixels is set to be a matrix x. In this case, the matrix y is expressed by the following Equation (2).

$$y = Hx + n \quad (2)$$

In Equation (2), H is a matrix indicating the combination B with respect to the combination A. Specifically, the number of rows in the matrix H is b, and the matrix H is a sparse matrix in which in each row, a column corresponding to the same combination A as the combination B corresponding to the row is set to 1 and all the remaining columns are set to 0. n is a noise matrix that has the same number of dimensions as the matrix y, and as the matrix n, those such as a Gausian model are applied.

Therefore, the image generation unit 75 obtains a matrix x using the matrix y and the matrix H. For this reason, first, the class categorization unit 74 determines the class of the matrix y using the following Equation (3).

$$\hat{i} = \max_{\{i\}} w_i P(y \mid cluster_i) \quad (3)$$

In Equation (3), i indicates the class. According to Equation (3), the class in which probability density $P(y \mid cluster\ i)$ meaning a probabilistic distance to the class is maximized is determined by the class of the matrix y.

Moreover, the probability density P(y|cluster i) can be obtained by the following Equation (4), using the matrix y and the normal distribution N as the learning parameter.

$$P(y|\text{cluster}_i) = N(y|Hm_i, H\Sigma_i H^T + \Sigma_n) \quad (4)$$

In Equation (4), $m_i$ is an average for the $class_i$, and $\Sigma_i$ is a covariance matrix of the $class_i$.

Next, the image generation unit 75 generates a matrix x with high accuracy using a technique called a linear minimum mean square error (LMMSE) estimation. The technique called LMMSE estimation is a technique in which when there are two discrete point groups, a coefficient of a linear projection function for bringing these two discrete point groups closest to each other is uniquely obtained using a statistic of the two discrete point groups.

Specifically, in the technique, the linear projection function of the matrix Y of a certain point group is defined by the following Equation (5).

$$\phi(Y) = aY + b \quad (5)$$

In Equation (5), a and b are coefficients.

Then, $\phi(Y)$ in which a square of a difference between the matrix X of a certain point group and $\phi(Y)$ is minimized is defined by the following Equation (6), using the statistics of the matrix X and the matrix Y.

$$\phi_{LMMSE(Y)} = \mu_X + \Sigma_{XY}\Sigma_Y^{-1}(Y - \mu_Y) \quad (6)$$

In Equation (6), $\mu_X$ and $\mu_Y$ are average values of the matrix X and the matrix Y. $\Sigma_{XY}$ and $\Sigma_Y$ are a covariance matrix of the matrix X and a variance of the matrix Y.

Now, a statistic of the matrix x that is desired to be obtained is obtained as the learning parameter of the class of the matrix y. Therefore, the image generation unit 75 applies the learning parameter of the class of the matrix y to Equation (6), and obtains the matrix x by the following Equation (7), using the matrix y and the matrix H.

$$x = m_i + \Sigma_i H^T (H \Sigma_i H^T + \Sigma_n)^{-1}(y - Hm_i) \quad (7)$$

Description of the Image Processing on the Photographic Image (Predicted Value thereof)

Figure 12A:
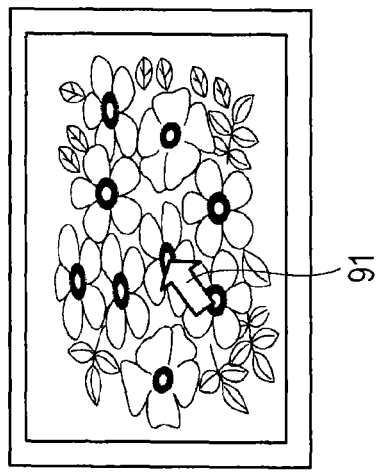
FIGS. 12A to 12C are diagrams for describing refocus processing.
Figure 12B:
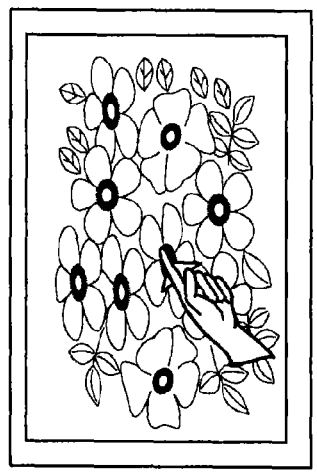
Figure 12C:
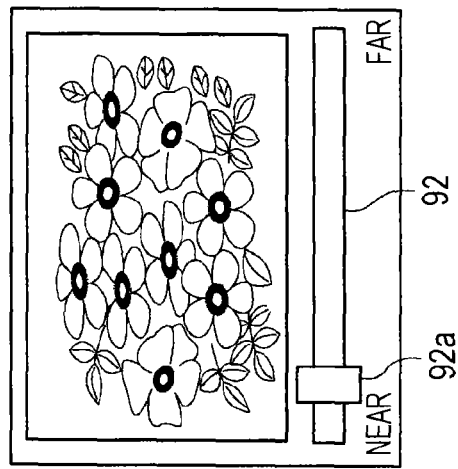

FIGS. 12A to 12C are diagrams for describing refocus processing as the image processing that is performed according to the operation by the user of the input unit 77.

As illustrated in FIG. 12A, if the input unit 77 is a mouse, for example, the user moves a cursor 91 to a photographic subject at a desired focus position using the input unit 77 while viewing the photographic image that is displayed on the display unit 78. Then, the user inputs a value of the desired focus position, for example, by clicking on the input unit 77.

Furthermore, as illustrated in FIG. 12B, if the input unit 77 and the display unit 78 are configured from a touch panel, the user, for example, touches on a photographic subject at the desired focus position with his/her finger or other tools on the input unit 77, while viewing the photographic image that is displayed on the display unit 78. Accordingly, the user inputs the value of the desired focus position.

Moreover, as illustrated in FIG. 12C, if the input unit 77 is a mouse, or if the input unit 77 and the display unit 78 make up a touch panel, for example, a slide bar 92 is displayed on the display unit 78, along with the photographic image. The user moves a slider 92a of the slide bar 92 with his/her finger or the mouse as the input unit 77, and thus changes the focus position value and inputs a desired focus position value. In an example in FIG. 12C, if the focus position is to be set to be farther away, the user moves the slider 92a in a direction to the right in the drawing. If the focus position is to be set to be closer, the user moves the slider 92a in a direction to the left in the drawing.

As described above, when the user inputs the desired focus position value using the input unit 77, the image generation unit 75 performs processing, as the refocus processing, that selects the photographic image corresponding to the focus position value that is input by the user, from among the generated photographic images (predicted values thereof).

Figure 13A:
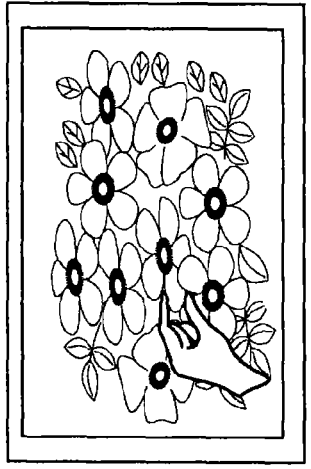
FIGS. 13A to 13C are diagrams for describing depth-of-field control processing.
Figure 13B:
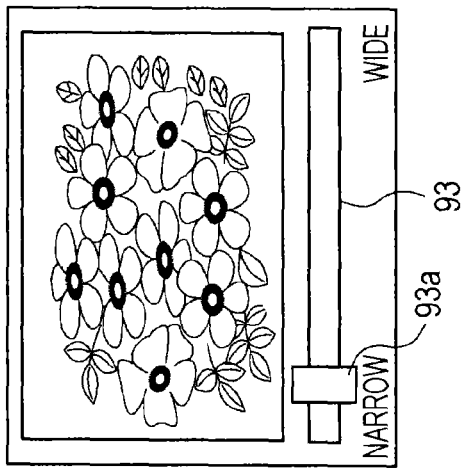
Figure 13C:
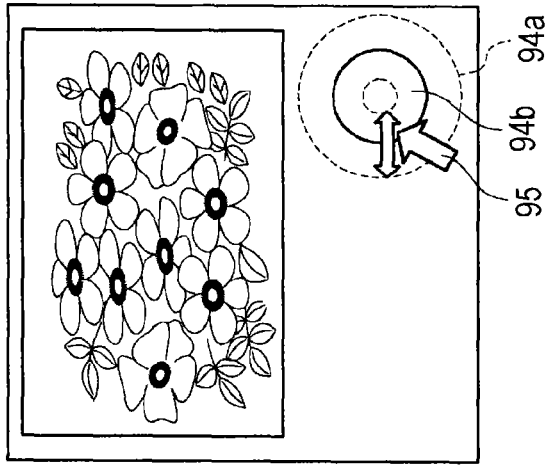

FIG. 13A to 13C are diagrams for describing depth-of-field control processing as the image processing that is performed according to the operation by the user of the input unit 77.

As illustrated in FIG. 13A, if the input unit 77 and the display unit 78 make up the touch panel, for example, while viewing the photographic image that is displayed on the display unit 78, the user performs pinch-in or pinch-out with his/her finger or other tools on the input unit 77 and thus inputs the desired f-stop value.

Furthermore, as illustrated in FIG. 13B, if the input unit 77 is a mouse, or if the input unit 77 and the display unit 78 make up a touch panel, for example, a slide bar 93 is displayed on the display unit 78 along with the photographic image. The user moves a slider 93a of the slide bar 93 with his/her finger or the mouse as the input unit 77, and thus changes the f-stop value and inputs a desired f-stop value. In an example in FIG. 13B, if a diaphragm aperture is to be broadened more, the user moves the slider 93a in the direction to the right in the drawing. If the diaphragm aperture is to be narrowed more, the user moves the slider 93a in the direction to the right in the drawing. Moreover, in FIG. 13B, a circle indicating a size of the diaphragm aperture, which corresponds to a photographic image, may be displayed on the display unit 78, along with the photographic image.

Moreover, as illustrated in FIG. 13C, if the input unit 77 is a mouse, or if the input unit 77 and the display unit 78 make up a touch panel, for example, a circle 94a indicating the size of the diaphragm aperture is displayed on the display unit 78. If the input unit 77 is a mouse, the user moves a cursor 95 to a circumference of a circle 94b indicating the size of the diaphragm aperture, which corresponds to a desired f-stop and performs clicking.

If the input unit 77 and the display unit 78 make up a touch panel, the user touches on the circumference of the circle 94b with his/her finger or other tools on the input unit 77, or performs pinch-in or pinch-out on the input unit 77 with his/her finger or other tools, and thus changes the circle 94a to the circle 94b. The circle 94a (94b) indicates that the larger the size, the larger the size of the diaphragm aperture.

As described above, when the user inputs the desired f-stop value using the input unit 77, the image generation unit 75 performs processing, as the depth-of-field control processing, that selects the photographic image corresponding to the f-stop that is input by the user, from among the generated photographic images (predicted values thereof).

Figure 14A:
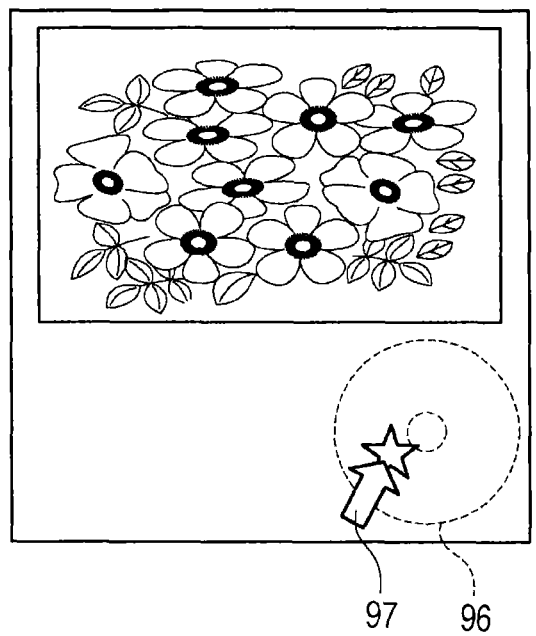
FIGS. 14A and 14B are diagrams for describing viewpoint conversion processing.
Figure 14B:
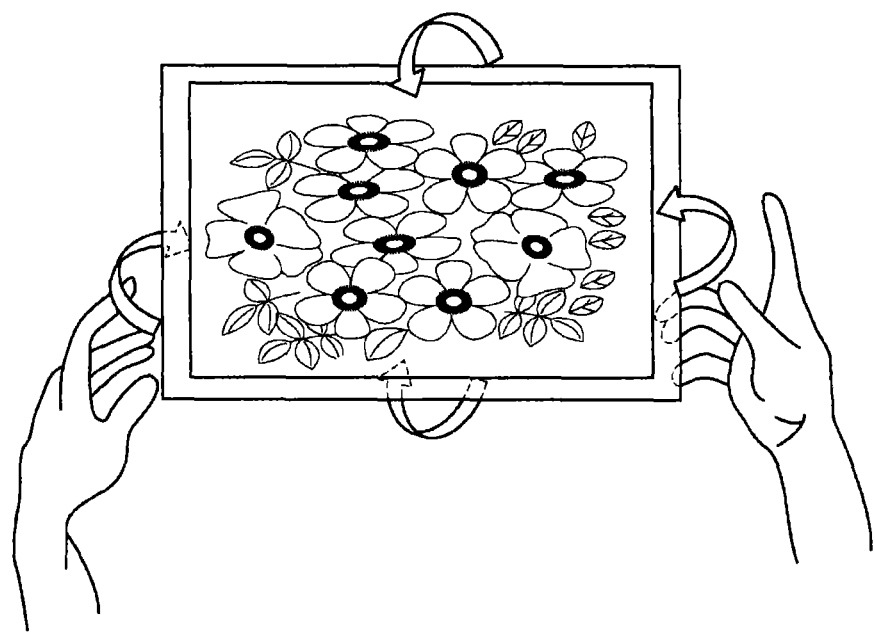

FIGS. 14A and 14B are diagrams for describing the viewpoint conversion processing as the image processing that is performed according to the operation by the user of the input unit 77.

As illustrated in FIG. 14A, if the input unit 77 is a mouse, or if the input unit 77 and the display unit 78 make up a touch panel, for example, a circle 96 indicating a range in which the viewpoint is movable is displayed on the display unit 78. The user moves a cursor 97 to a position on the circle 96 corresponding to a desired viewpoint with the mouse as the input unit 77 and thus performs clicking, or specifies a position on the circle 96 corresponding to the desired viewpoint with his/her finger, and thus inputs the desired viewpoint.

As illustrated in FIG. 14B, if the imaging apparatus 70 is a tablet-type terminal and the input unit 77 is a gyroscope sensor or the like that detects an orientation of the imaging apparatus 70, for example, judging from a desired viewpoint, the user changes the orientation of the imaging apparatus 70 to a direction of a user's gaze. Accordingly, the user inputs the desired viewpoint.

As described above, when the user inputs the desired viewpoint using the input unit 77, the image generation unit 75 performs the viewpoint conversion processing.

Moreover, as the image processing by the image generation unit 75, processing other than the types of processing described above can be employed. For example, the image generation unit 75 may perform processing, as the image processing, that generates an image whose focus position is a focus position that is desired by the user, and whose viewpoint is a viewpoint that is desired by the user.

Figure 15:
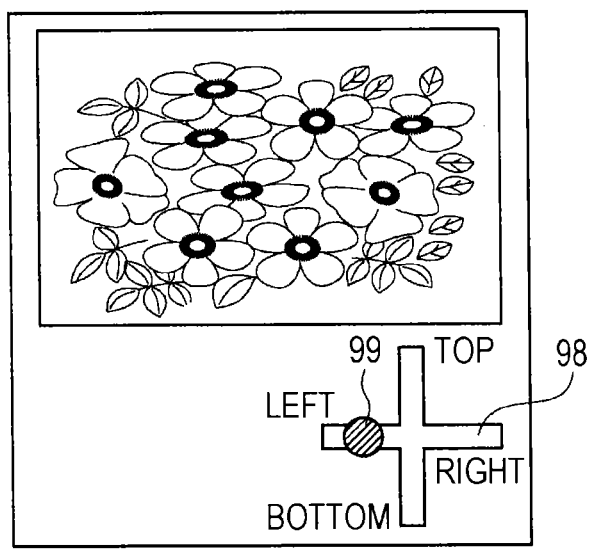
FIG. 15 is a diagram for describing another example of image processing.

In this case, as illustrated in FIG. 15, when the input unit 77 is a mouse, or when the input unit 77 and the display unit 78 make up a touch panel, for example, a biaxial slide bar 98 for moving the focus position is displayed on the display unit 78. Furthermore, a cursor 99 indicating a position of the viewpoint is displayed on the biaxial slide bar 98.

The user operates upper, lower, left, and right ends of the biaxial slide bar 98 with the mouse as the input unit 77 or his/her finger, and moves a region for adjusting focus on the photographic image vertically and horizontally. Accordingly, the user inputs a value indicating a position of the region as the focus position, as a value of a desired focus position. Furthermore, the user moves a cursor 99 on the biaxial slide bar 98 vertically and horizontally with the mouse as the input unit 77 or his/her finger, and thus arranges the cursor 99 to be at a desired viewpoint. Accordingly, the user inputs the desired viewpoint.

As described above, when the user inputs the desired focus position and viewpoint using the input unit 77, the image generation unit 75 performs processing, as the image processing, that generates an image corresponding to the focus position and the viewpoint.

The image processing by the image generation unit 75 may be a combination of the types of processing that are described above.

Description of Image Generation Processing

FIG. 16 is a flow chart for describing image generation processing by the imaging apparatus 70 in FIG. 8.

In Step S31 in FIG. 16, the imaging unit 71 of the imaging apparatus 70 sets the combination of the focus position value and the f-stop value to different combinations B the number of which is b (b<a) and performs the photographing. The imaging unit 71 supplies to the vector generation unit 72 the multiple photographic images that are obtained as a result of the photographing.

In Step S32, the vector generation unit 72 performs the calibration on the multiple photographic images that are supplied from the imaging unit 71. In Step S33, the vector generation unit 72 generates the vectors indicating the pixel values of the pixels in the same position, among the multiple post-calibration photographic images. The vector generation unit 12 supplies the vector of each pixel to the normalization unit 73.

In Step S34, the normalization unit 73 normalizes the vector of each pixel that is supplied from the vector generation unit 72 in such a manner that the absolute value of the vector is 1, and supplies the result of the normalization to the class categorization unit 74.

In Step S35, the class categorization unit 74 categorizes by class the vector for every pixel, which is supplied from the normalization unit 73. The class categorization unit 74 supplies the class and vector of each pixel to the image generation unit 75.

In Step S36, for every pixel, the image generation unit 75 generates the photographic image (predicted value thereof) that is available if the combination of the focus position value and the f-stop value is the combination A, based on the normal distribution N of the class of the pixel and the vector that are stored in the storage unit 76.

In Step S37, the image generation unit 75 performs predetermined image processing on the generated photographic image, and outputs a result of the image processing. Then, the image generation processing ends.

As described above, from the photographic images that are captured using the multiple photographic parameters, the imaging apparatus 70 generates a predicted value of a photographic image in which values of multiple photographic parameters are different from a value of the photographic image. Therefore, a large number of photographic images (predicted values thereof) that are different, in a combination of the values of the multiple photographic parameters, from one another, can be generated from a small number of photographic images that are different, in the combination of the values of the multiple photographic parameters, from one another. Accordingly, the photographic image can be easily prepared that is used in the refocus processing, the depth-of-field control processing, the depth generation processing, the viewpoint conversion processing, the three-dimensional image generation processing, the high-dynamic-range image generation processing, and the like.

Furthermore, because the imaging apparatus 70 can generate the photographic images (predicted values thereof) that are different, in the combination of the values of the multiple photographic parameters, from one another, the imaging apparatus 70 performs two or more types of processing at the same time, among the refocus processing, the depth-of-field control processing, the depth generation processing, the viewpoint conversion processing, the three-dimensional image generation processing, the high-dynamic-range image generation processing, and the like. For example, the refocus processing and the high-dynamic-range image generation processing can be performed at the same time to generate an image in the high dynamic range that is set to be at a desired focus position.

Second Embodiment

Configuration Example of an Image Processing System According to One Embodiment

FIG. 17 is a block diagram illustrating a configuration example of an image processing system 110 to which the present disclosure applies.

The image processing system 110 in FIG. 17 is configured from terminal equipment 111 and a server 112. In the image processing system 110, the terminal equipment 111 performs the photographing, and the server 112 generates the photographic image (predicted value thereof).

Specifically, the terminal equipment 111 of the image processing system 110 has the same configuration as the imaging unit 71, the input unit 77, and the display unit 78 that are illustrated in FIG. 8. The terminal equipment 111 sets the combination of the focus position value and the f-stop value to the different combination B the number of which is b, and thus performs the photographing, in the same manner as the imaging unit 71. The terminal equipment 111 transmits multiple photographic images that are obtained as a result of the photographing, to the server 112 over a network not illustrated.

Furthermore, an operation is applied by the user to the terminal equipment 111 and according to the operation, information is supplied to the server 112 over the network not illustrated, in the same manner as the input unit 77. Moreover, the terminal equipment 111 receives a result of the image processing that is transmitted from the server 112 over the network not illustrated. The terminal equipment 111 displays the result of the image processing on the display unit 78, whenever necessary, in the same manner as the display unit 78.

The server 112 has the same configuration as the vector generation unit 72, the normalization unit 73, the class categorization unit 74, the image generation unit 75, and the storage unit 76. The server 112 receives the multiple photographic images that are supplied from the terminal equipment 111. Furthermore, the server 112 generates the photographic image (predicted value thereof) having the combination A, from the photographic image having the combination B, which is received, in the same manner as the vector generation unit 72, the normalization unit 73, the class categorization unit 74, and the image generation unit 75. Then, the server 112 performs the image processing on the generated photographic image (predicted value thereof) in the same manner as the image generation unit 75. The server 112 transmits a result of the image processing to the terminal equipment 111.

Moreover, the focus position and the f-stop are described above as being employed as the photographic parameters, but shutter speed, ISO sensitivity, chroma, white balance, contrast, and the like may be employed.

If the shutter speed is employed as one photographic parameter, for example, processing disclosed in Paul E. Debevec and Jitendra Malik, Recovering High Dynamic Range Radiance Maps from Photographs. In SIGGRAPH 97, August 1997 can be set to be the high-dynamic-range image generation processing. If the ISO sensitivity is employed as one photographic parameter, for example, the high-dynamic-range image generation processing can be performed in the same manner as the technique that uses the shutter speed disclosed in Paul E. Debevec and Jitendra Malik, Recovering High Dynamic Range Radiance Maps from Photographs. In SIGGRAPH 97, August 1997, using the stack of the photographic images that are different only in the ISO sensitivity, from one another, among the generated photographic images.

Furthermore, the photographing is described above as being performed in such a manner that the photographic images are different in the combination of values of two photographic parameters, from one another, but the photographing may be performed in such a manner that the photographic images are different in the combination of values of three or more photographic parameters.

Moreover, the vector is described above as being generated for every pixel. However, the vector may be generated for every region that is made from the multiple pixels, and the photographic image (predicted value thereof) having the combination A may be generated in a unit of region.

Furthermore, the photographic image (predicted value thereof) having the focus position or f-stop that is desired by the user is described above as being selected in the refocus processing or the depth-of-field control processing after the photographic image (predicted value thereof) having the combination A is generated. However, only the photographic images having the focus position or f-stop that is desired by the user may be directly generated from the photographic image having the combination B.

Third Embodiment

Description of a Computer to which the Present Disclosure Applies

A sequence of processing described above may be executed in hardware and may be executed in software. In a case where the sequence of processing is executed in software, a program making up the software is installed on a computer. The computer here include a computer that is built into dedicated hardware, a general-purpose personal computer that is capable of executing various functions by installing various programs, and the like.

Figure 18:
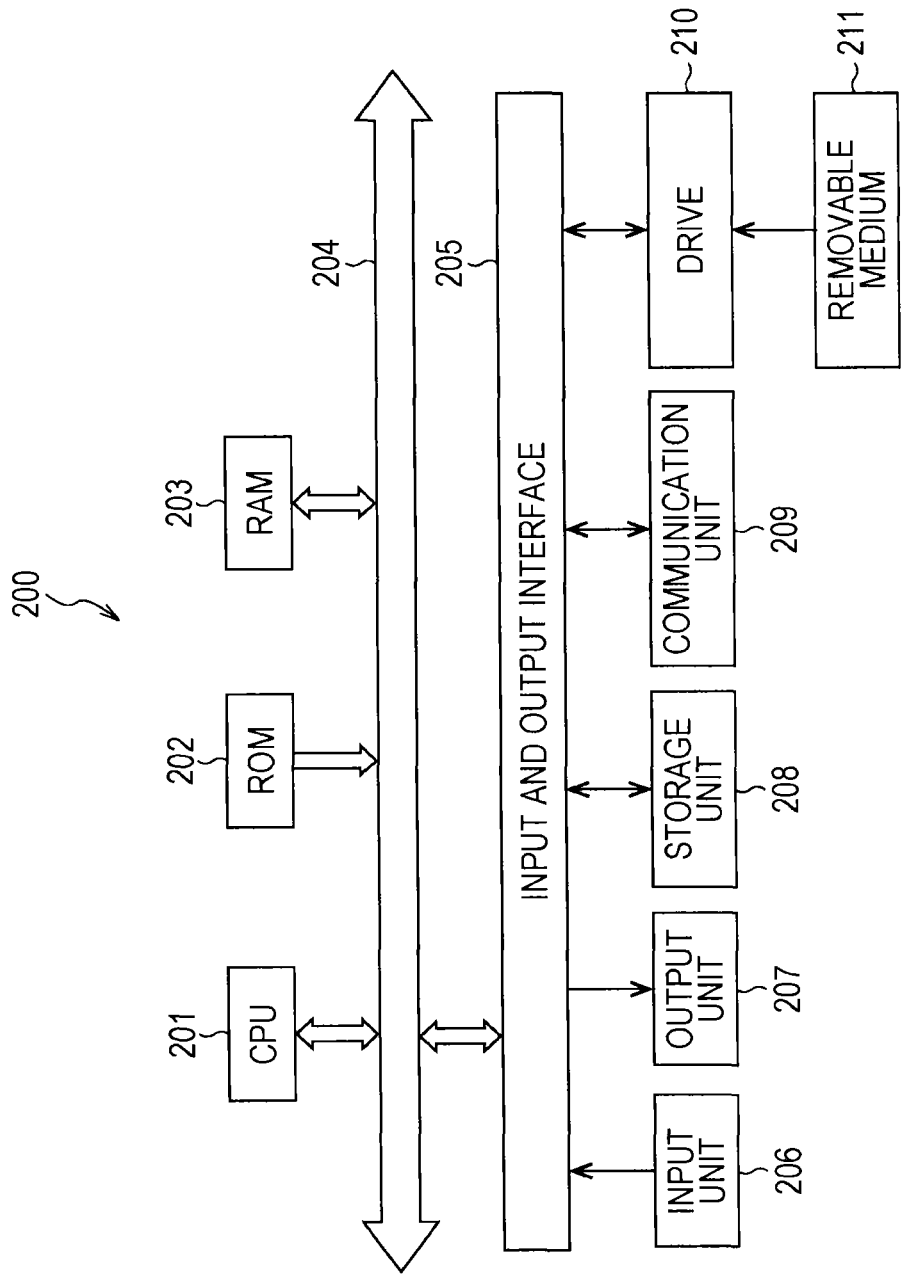
FIG. 18 is a block diagram illustrating a hardware configuration example of a computer.

FIG. 18 is a block diagram illustrating an example of a hardware configuration of the computer that executes the sequence of processing described above using the program.

In the computer 200, a central processing unit (CPU) 201, a read only memory (ROM) 202, and a random access memory (RAM) 203 are connected to one another through a bus 204.

An input and output interface 205 is connected to the bus 204. An input unit 206, an output unit 207, a storage unit 208, a communication unit 209, and a drive 210 are connected to the input/output interface 205.

The input unit 206 is configured as a keyboard, a mouse, a microphone, or the like. The output unit 207 is configured as a display, a speaker, or the like. The storage unit 208 is configured as a hard disk, a non-volatile memory, or the like. The communication unit 209 is configured as a network interface, or the like. The drive 210 drives a removable medium 211, such as a magnetic disk, an optical disc, a magneto-optical disk, or a semiconductor memory.

In the computer 200 with the configuration described above, the CPU 201 performs the sequence of processing described above, for example, by loading the program stored in the storage unit 208 onto the RAM 203 through the input/output interface 205 and the bus 204 and thus executing the program.

The program executed by the computer 200 (the CPU 201) can be recorded, for example, on the removable medium 211 such as a package medium and thus may be provided. Furthermore, the program can be provided through a cable or wireless transmission medium such as a local area network, the Internet, and digital satellite broadcasting.

In the computer 200, the program can be installed in the storage unit 208 through the input/output interface 205 by mounting the removable medium 211 onto the drive 210. Furthermore, the program can be received with the communication unit 209 through the cable or wireless transmission medium and be installed on the storage unit 208. In addition, the program can be installed in advance on the ROM 202 or in the storage unit 208.

Moreover, the program that is executed by the computer 200 may be a program by which the processing is performed in time series in the order described in the present specification, or may be a program by which the processing is performed in parallel at a necessary timing, such as when a call for the program is performed.

Furthermore, in the present specification, the step of describing the program stored on the program recording medium includes not only processing that is performed in time series according to the described order, but also processing that is performed in parallel or individually even though the processing is not necessarily performed in time series.

Furthermore, in the present disclosure, the system means a combination of multiple constituent elements (an apparatus, a module (component) and the like), regardless of whether or not they are all in the same housing. Therefore, multiple apparatuses that are individually in different housings and are connected to each other over a network is the system, and one apparatus in which multiple modules are contained in one housing is the system as well.

The effects described in the present specification are only for illustration and thus are not limited to this illustration, and other effects may be present.

Embodiments according to the present disclosure are not limited to the embodiments described above, and various modifications are possible within a scope that does not deviate from the gist of the present disclosure.

For example, according to the present disclosure, cloud computing in which one function is shared and jointly processed by multiple apparatuses over a network may be employed as a configuration.

Furthermore, each step described referring to the flow chart may be shared and jointly performed by multiple apparatuses, in addition to being performed by one apparatus.

Moreover, in a case where multiple types of processing are included in one step, the multiple types of processing included in the one step may be shared and jointly performed by multiple apparatuses, in addition to being performed by one apparatus.

Furthermore, the present disclosure can be configured as follows.

(1) An image processing apparatus including an image generation unit that, from photographic images that are captured using multiple photographic parameters, generates an image of which values of the multiple photographic parameters are different from values of the photographic image.

(2) The image processing apparatus according to (1), in which the image generation unit is configured in such a manner as to generate the image based on learning parameters learned using multiple learning photographic images that are different, in the values of the multiple photographic parameters, from one another.

(3) The image processing apparatus according to (1) or (2), in which the photographic parameter is configured to be a focus position.

(4) The image processing apparatus according to (3), in which the image generation unit is configured in such a manner as to generated a depth value of the photographic image based on the images that are generated by the image generation unit and that are different in a focus position value.

(5) The image processing apparatus according to (4), in which the image generation unit is configured in such a manner as to generated a three-dimensional image using the depth value of the photographic image and the photographic image.

(6) The image processing apparatus according to any one of (3) to (5), in which the image generation unit is configured in such a manner as to generate a light field of the photographic image based on the images that are generated by the image generation unit and that are different in the focus position value and to perform viewpoint conversion on the photographic image based on the light field.

(7) The image processing apparatus according to any one of (1) to (6), in which the photographic parameter is configured to be an f-stop.

(8) The image processing apparatus according to any one of (1) to (7), in which the photographic parameter is configured to be a shutter speed.

(9) The image processing apparatus according to any one of (1) to (8), in which the photographic parameter is configured to be ISO sensitivity.

(10) The image processing apparatus according to any one of (1) to (9), further including an input unit into which a value of the photographic parameter is input, in which the image generation unit is configured in such a manner as to output the image based on the value that is input into the input unit.

(11) The image processing apparatus according to any one of (1) to (10) further including a reception unit that receives the photographic image, and a transmission unit that transmits the image that is generated by the image generation unit.

(12) An image processing method including causing an image processing apparatus to generate from photographic images that are captured using multiple photographic parameters an image in which values of the multiple photographic parameters are different from a value of the photographic image.

(13) A program for causing a computer to function as an image generation unit that, from photographic images that are captured using multiple photographic parameters, generates an image of which values of the multiple photographic parameters are different from values of the photographic image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   circuitry configured to:
      capture a reference photographic image by using optimal values of multiple photographic parameters for the image processing apparatus, the photographic parameters including a focus position, an aperture size, a shutter speed, and light sensitivity;
      generate an image stack that includes a plurality of photographic images, each of the plurality of photographic images being captured by using a first set of a plurality of combinations of the multiple photographic parameters, each of the plurality of photographic images having at least one photographic parameter that is different from the optimal values for the reference photographic image; and
      predict an image from the reference photographic image and the image stack by using a second set of the plurality of combinations of the multiple photographic parameters, wherein
   values of the second set of the plurality of combinations of the multiple photographic parameters are different from values of the first set of the plurality of combinations.

2. The image processing apparatus according to claim 1, wherein the circuitry is configured to predict the image based on learning parameters learned using multiple learning photographic images that are different, in the values of the first plurality of combinations of the multiple photographic parameters, from one another.

3. The image processing apparatus according to claim 1, wherein the circuitry is configured to predict a depth value of the predicted image based on the images that are predicted by the circuitry and that are different in a value of the focus position.

4. The image processing apparatus according to claim 3, wherein the circuitry is configured to generate a three-dimensional image using the depth value of the predicted image and the predicted image.

5. The image processing apparatus according to claim 1, wherein the circuitry is configured to generate a light field of the photographic image based on the images that are generated by the circuitry and that are different in a value of the focus position, and to perform viewpoint conversion on the photographic image based on the light field.

6. The image processing apparatus according to claim 1, wherein
the circuitry is configured to:
input a value of the photographic parameter, and
output the image based on the value that is input into the circuitry.

7. The image processing apparatus according to claim 1, wherein
the circuitry is configured to:
receive the reference photographic image and the image stack including the plurality of photographic images; and
transmit the image that is generated by the circuitry.

8. An image processing method comprising:
capturing, by circuitry of the image processing apparatus, a reference photographic image by using optimal values of multiple photographic parameters for the image processing apparatus, the photographic parameters including a focus position, an aperture size, a shutter speed, and light sensitivity;
generating, by the circuitry, an image stack that includes a plurality of photographic images, each of the plurality of photographic images being captured by using a first set of a plurality of combinations of the multiple photographic parameters, each of the plurality of photographic images having at least one photographic parameter that is different from the optimal values for the reference photographic image; and
predicting, by the circuitry, an image from the reference photographic image and the image stack by using a second set of the plurality of combinations of the multiple photographic parameters, wherein
values of the second set of the plurality of combinations of the multiple photographic parameters are different from values of the first set of the plurality of combinations.

9. A non-transitory computer readable medium comprising computer program instructions that, when executed by an imaging processing apparatus including circuitry cause the circuitry to:
capture a reference photographic image by using optimal values of multiple photographic parameters for the image processing apparatus, the photographic parameters including a focus position, an aperture size, a shutter speed, and light sensitivity;
generate an image stack that includes a plurality of photographic images, each of the plurality of photographic images being captured by using a first set of a plurality of combinations of the multiple photographic parameters, each of the plurality of photographic images having at least one photographic parameter that is different from the optimal values for the reference photographic image; and
predict an image from the reference photographic image and the image stack by using a second set of the plurality of combinations of the multiple photographic parameters, wherein
values of the second set of the plurality of combinations of the multiple photographic parameters are different from values of the first set of the plurality of combinations.

10. The image processing method according to claim 8, further comprising:
predicting, by the circuitry, the image based on learning parameters learned using multiple learning photographic images that are different, in the values of the first plurality of combinations of the multiple photographic parameters, from one another.

11. The image processing method according to claim 8, further comprising:
predicting, by the circuitry, a depth value of the predicted image based on the images that are predicted by the circuitry and that are different in a value of the focus position.

12. The image processing method according to claim 11, further comprising:
generating, by the circuitry, a three-dimensional image using the depth value of the predicted image and the predicted image.

13. The image processing method according to claim 8, further comprising:
generating, by the circuitry, a light field of the photographic image based on the images that are generated by the circuitry and that are different in a value of the focus position; and
performing, by the circuitry, viewpoint conversion on the photographic image based on the light field.

14. The image processing method according to claim 8, further comprising:
inputting, by the circuitry, a value of the photographic parameter; and
outputting, by the circuitry, the image based on the value that is input into the circuitry.

15. The image processing method according to claim 8, further comprising:
receiving, by the circuitry, the reference photographic image and the image stack including the plurality of photographic images; and
transmit, by the circuitry, the image that is generated by the circuitry.

16. The non-transitory computer readable medium comprising computer program instructions according to claim 9, wherein
the circuitry is further caused to predict the image based on learning parameters learned using multiple learning photographic images that are different, in the values of the first plurality of combinations of the multiple photographic parameters, from one another.

17. The non-transitory computer readable medium comprising computer program instructions according to claim 9, wherein
the circuitry is further caused to:
predict a depth value of the predicted image based on the images that are predicted by the circuitry and that are different in a value of the focus position; and
generate a three-dimensional image using the depth value of the predicted image and the predicted image.

18. The non-transitory computer readable medium comprising computer program instructions according to claim 9, wherein
the circuitry is further caused to:
generate a light field of the photographic image based on the images that are generated by the circuitry and that are different in a value of the focus position; and
perform viewpoint conversion on the photographic image based on the light field.

19. The non-transitory computer readable medium comprising computer program instructions according to claim 9, wherein
the circuitry is further caused to:

input a value of the photographic parameter; and
output the image based on the value that is input into the circuitry.

20. The non-transitory computer readable medium comprising computer program instructions according to claim 9, wherein
the circuitry is further caused to:
receive the reference photographic image and the image stack including the plurality of photographic images; and
transmit the image that is generated by the circuitry.

* * * * *